P. Kephart.
Refigerator.
Nº 3758
Patented Sept. 24. 1844.

UNITED STATES PATENT OFFICE.

PETER KEPHART, OF UNIONTOWN, MARYLAND.

FRUIT AND VEGETABLE PRESERVER.

Specification of Letters Patent No. 3,758, dated September 24, 1844.

*To all whom it may concern:*

Be it known that I, PETER KEPHART, of Uniontown, in the county of Carroll and State of Maryland, have invented a new and useful Apparatus for the Preserving of Fruit and Vegetables by the Cooling Agency of Ice; and I do hereby declare that the following is a full and exact description thereof.

It is a fact well known that fruit and other vegetable substances may be preserved in a perfect state for an indefinite length of time if kept at a temperature nearly approaching the freezing point of water without being actually allowed to freeze. The apparatus which I have constructed is intended to produce this condition. I effect the desired purpose by placing the articles to be preserved in a compartment in which they are surrounded on all sides by ice, or by water at, or near, the freezing temperature, and so disposed as not to endanger the articles becoming frozen; the apparatus being, also, so constructed as to admit of the renewing of the ice at the top, or the sides, whenever it is requisite so to do.

The structure, when complete, is usually divided into two principal compartments, one of which constitutes an ice house from which the ice necessary to the second, or the fruit and vegetable preserver, is to be supplied; this combination of two such compartments is not, however, absolutely necessary, as the preserving compartment may be constructed and used where there is already an ice-house; or where, from any cause, it may be desirable to separate the two.

Figure 4:
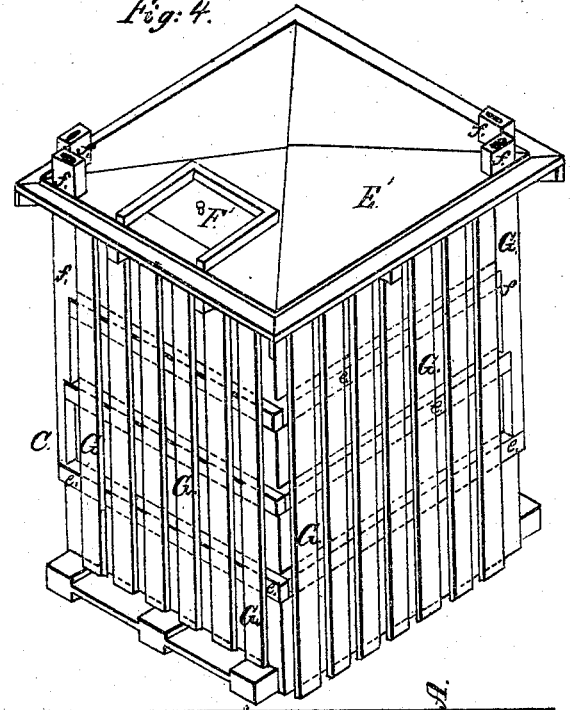
Figure 3:
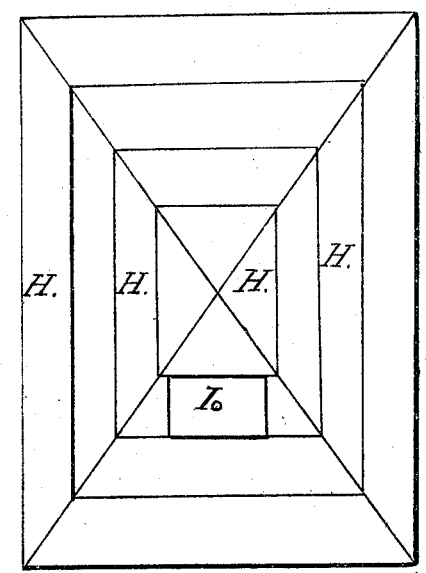
Figure 1:
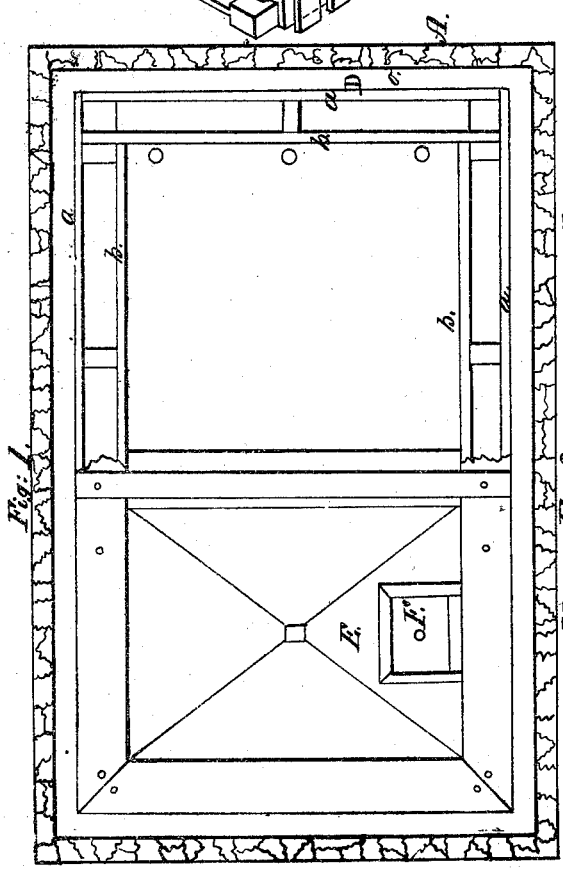
Figure 2:
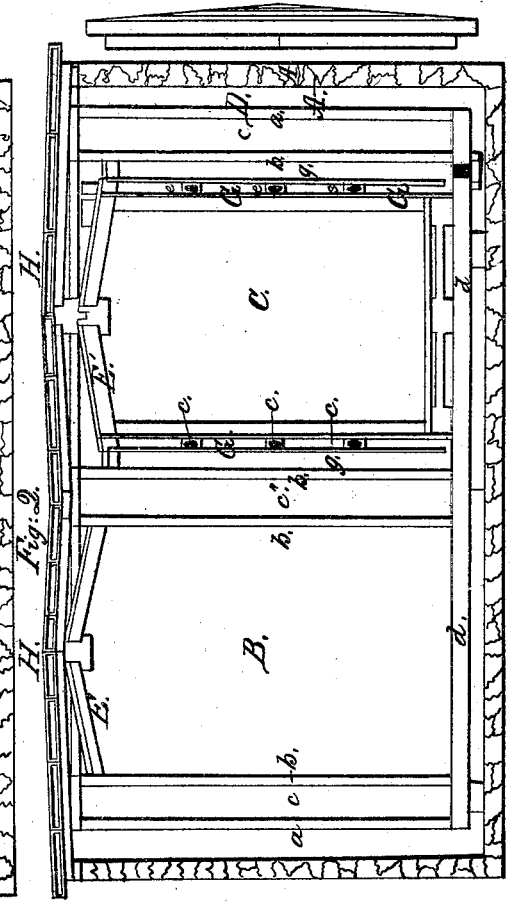

In the accompanying drawing, Figure 1 is a top view of the structure when consisting of the two compartments above named, the covering, or roof, being removed from the ice-house compartment, and a second, or lower, covering, from the preserving compartment. Fig. 2 is a vertical section through the middle of the ice-house, and of the room for containing the preserving compartment. Fig. 3 is the roof, or upper covering, of one of the compartments, the two being similarly constructed. Fig. 4 is an outside view of the preserving compartment, separated from the other parts of the structure.

A, A, represents the ground, or rather a wall of stone, or of brick, to support the excavation in the ground within which the compartments are situated.

B, is the ice-house, and C, the preserving compartment.

D, D, is a space left between the compartments and the wall, or ground, to prevent the communication of heat between them. Each of the compartments is formed of a double box of plank, a, a, and b, b, having a space, c, c, between them, which is to be filled with charcoal, tan bark, or other bad conductor of heat. Between the two compartments, when conjoined, there is also a similar filling, as at c″. The flooring, d, d, of the compartments is supported above the bottom of the excavation, to protect them from the heat of the ground, and also to allow of a free passage to the water produced by the thawing of the ice.

E, E′, Figs. 1, 2, and 4, represent the second, or lower, covering, to each of the compartments, which covering, like the roof, or upper covering, to be presently described, is slightly pyramidal, sloping from the center to each of the sides.

F, F′, are doors through which an entrance may be had to either of the compartments.

Ice may be placed upon the covering E, of the ice-house, and, as this melts, the water from it will trickle down an inner wall of the ice compartment, and will absorb any heat which might otherwise find its way through the charcoal, or other imperfect conductor, and will, as I believe, be thus economically employed, while the cold water thus produced will flow under the preserving compartment, and tend to keep it the proper temperature.

I have thus described the manner in which I, in general, intend to construct and manage the ice compartment, but as this is only auxiliary to the preserving compartment, and does not differ materially from some other ice-houses, I do not intend to make any claim to this part of the structure.

I will now describe the preserving compartment, C, Fig. 4, shown also in section in Fig. 2, this compartment is to be contained within an excavation finished in all respects like that for ice, but it consists of a box distinct therefrom. In forming this, a receptacle, or room, is made of plank, having a covering, E′, as described. This receptacle I surround on all sides with several troughs, or tubes, e, e, which, when desired, may be filled with water; in the section Fig. 2, they are represented as tubes.

$f, f$, are vertical tubes through which the water may be poured into those marked $e, e$, This is only to be done when, from excessive cold, there may be danger that the contents of the vegetable compartment might freeze, an event which by this provision may be effectually prevented.

$G, G$, are plank on the outsides of the troughs, $e, e$, serving to prevent the ice which may be interposed between the compartment $C$, and the excavation containing it, from coming into direct contact with the inner planking; $g, g$, is the space between the preserving compartment and the excavation.

Over the excavation for the preserving compartment, and also over the ice-house, when the two are combined, I place a roof or covering, $H, H$, Figs. 2 and 3. This covering consists of shallow boxes, closely fitted together, and containing charcoal, or other bad conductor of heat. Between this and the covering $E, E'$, is a space for the stowing of a stratum of ice; and when this requires to be renewed, either of the shallow boxes may be removed without disturbing the others. When it is desired to enter the ice-house, or the preserving compartment, a door $I$, in the upper covering, corresponding with the doors, $F, F'$, in the lower, may be removed. The vegetable compartment does not reach to the bottom of the excavation in which it is placed, but sufficient space is allowed for the passing off of water, provision being made to allow such water to be absorbed by the ground, or to escape in any other way. The covering, $E'$, of the vegetable preserver conducts the water, produced by the melting of the ice, on to the inner side of the planking, $b, b$, down which it trickles; and for the more hardy fruits and vegetables, which have little tendency to ferment, this will suffice for their protection; but for the preservation of the more delicate kinds, which soon spoil, ice must be passed into the space $g, g$; but the space should be a few inches only in width, so that the bulk of ice shall be but small.

Having thus, fully described the nature of my apparatus for the preservation of fruit and other vegetables, and shown the operation thereof, what I claim therein as new, and desire to secure by Letters Patent, is—

The so constructing of said apparatus, in the manner herein described, as that the substances contained in the preserving compartment may be subjected to the influence of the ice deposited on the covering $E'$, in conjunction with that of the ice-cold water produced by its melting; or to the additional influence of a thin stratum of ice surrounding the sides of said compartment; or to the moderated temperature produced by the supplying of water to the tubes, or troughs, $e, e$; the respective parts being combined, arranged, and operating, substantially as herein set forth.

PETER KEPHART.

Witnesses:
 Thos. P. Jones,
 Philip R. Owings.